United States Patent [19]
Applegate

[11] Patent Number: 5,949,972
[45] Date of Patent: Sep. 7, 1999

[54] SYSTEM FOR MEMORY ERROR CHECKING IN AN EXECUTABLE

[75] Inventor: Arthur D. Applegate, Redmond, Wash.

[73] Assignee: Compuware Corporation, Farmington Hills, Mich.

[21] Appl. No.: 08/702,111

[22] Filed: Aug. 23, 1996

[51] Int. Cl.[6] .................................................. G06F 11/00
[52] U.S. Cl. ............................ 395/185.07; 395/185.06; 711/154
[58] Field of Search ..................... 395/185.06, 185.07, 395/185.01, 183.14, 183.11, 622, 670, 677, 678, 478, 477; 711/100, 151, 152, 150, 154; 707/206

[56] References Cited

U.S. PATENT DOCUMENTS

| | | | |
|---|---|---|---|
| 3,999,052 | 12/1976 | Gooding et al. | 340/172.5 |
| 4,907,151 | 3/1990 | Nartlett | 364/200 |
| 5,088,036 | 2/1992 | Ellis et al. | 395/425 |
| 5,121,501 | 6/1992 | Baumgartner et al. | 395/183.11 |
| 5,193,180 | 3/1993 | Hastings | 395/575 |
| 5,233,611 | 8/1993 | Triantafyllos et al. | 395/183.14 |
| 5,321,834 | 6/1994 | Weiser et al. | 395/600 |
| 5,325,530 | 6/1994 | Mohrmann | 395/183.11 |
| 5,327,550 | 7/1994 | Pribnow | 395/575 |
| 5,355,469 | 10/1994 | Sparks et al. | 395/575 |
| 5,355,483 | 10/1994 | Serlet | 395/650 |
| 5,404,488 | 4/1995 | Kerrigan et al. | 395/425 |
| 5,491,808 | 2/1996 | Geist, Jr. | 711/100 |
| 5,528,753 | 6/1996 | Fortin | 395/183.11 |
| 5,535,329 | 7/1996 | Hastings | 395/183.11 |
| 5,561,786 | 10/1996 | Morse | 395/497.01 |
| 5,579,476 | 11/1996 | Cheng et al. | 395/183.08 |
| 5,581,697 | 12/1996 | Gramlich et al. | 395/183.11 |
| 5,634,022 | 5/1997 | Crouse et al. | 395/704 |
| 5,644,709 | 7/1997 | Austin | 395/185.06 |
| 5,652,883 | 7/1997 | Adcock | 395/622 |

OTHER PUBLICATIONS

Adams, Timothy, "Intercepting DLL Function Calls", *Windows/DOS Developer's Journal*, Jun., 1992.

*Primary Examiner*—Joseph E. Palys
*Attorney, Agent, or Firm*—Fenwick & West LLP

[57] ABSTRACT

The invention modifies an executing instance (target process) of an arbitrary computer program by replacing the heap manager in the target process. All functions in the process that manipulate dynamic memory are patched with replacement functions that implement improved heap management. The invention is applicable to any computer program that makes use of dynamic (heap) memory. In a second aspect of the invention, the improved heap implementation performs heap error checking in addition to managing heap storage. Alternative embodiments use the invention to improve performance (speed) using fast allocation algorithms, improve space efficiency of the program, or implement tracing of heap activity for debugging purposes.

3 Claims, 6 Drawing Sheets

\* Optional step: required only if heap replacement occurs after process initialization.

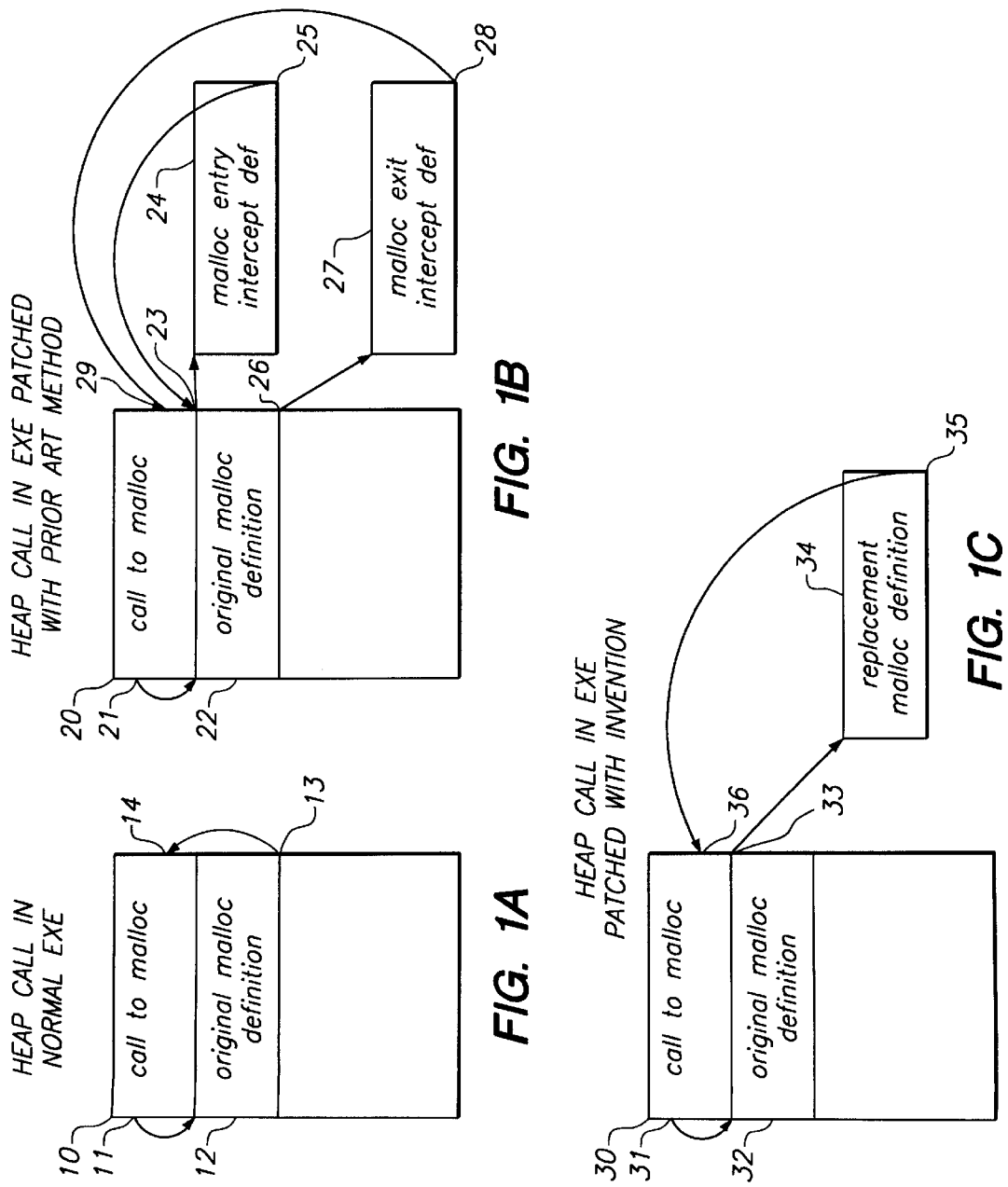

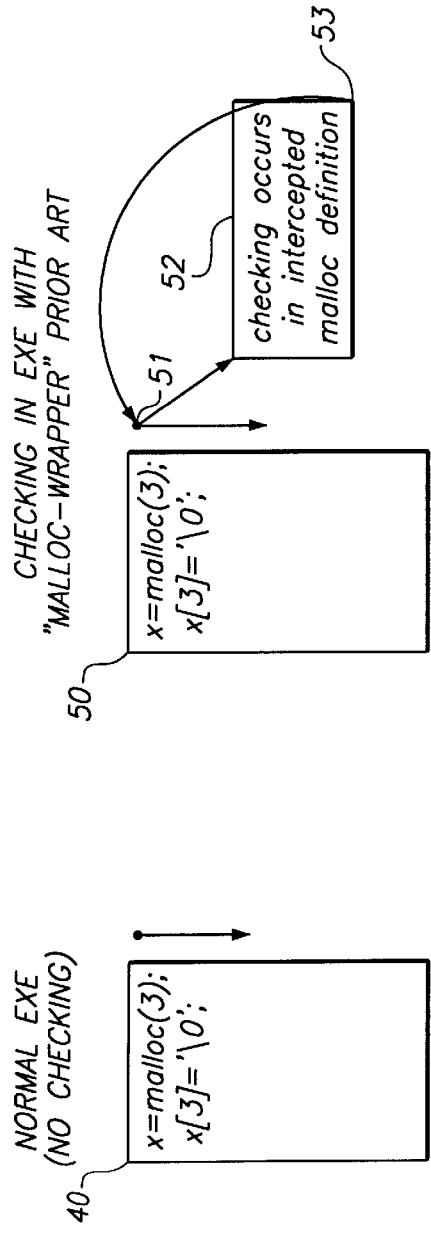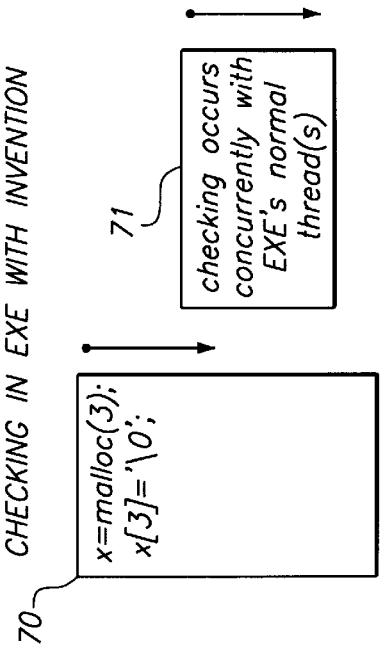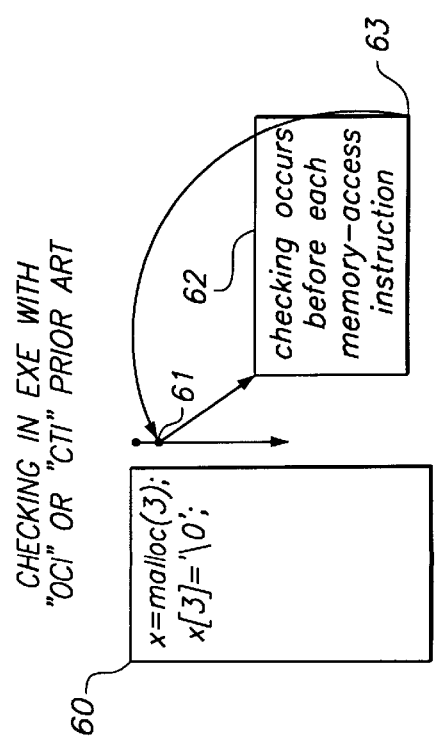
FIG. 2A — NORMAL EXE (NO CHECKING)
FIG. 2B — CHECKING IN EXE WITH "MALLOC-WRAPPER" PRIOR ART
FIG. 2C — CHECKING IN EXE WITH "OCI" OR "CTI" PRIOR ART
FIG. 2D — CHECKING IN EXE WITH INVENTION \* Optional step: required only if heap replacement occurs after process initialization.

SYSTEM FOR MEMORY ERROR CHECKING IN AN EXECUTABLE

BACKGROUND OF THE INVENTION

The present invention relates generally to a method and apparatus for replacing the heap implementation in an existing executable computer program at runtime. In particular, the present invention relates to a method for replacing the heap implementation for the purpose of detecting errors in the use of heap memory in the program. Most particularly, this purpose is to detect memory overwrites, frees of unallocated pointers, writes to free memory, reads of unallocated or uninitialized memory, and memory leaks; and to detect these errors with minimal impact on the runtime speed of the program.

Memory errors have been a major source of software quality problems for decades, but as the complexity of software increases, these errors have become much more difficult to track down. There are several reasons for this difficulty.

First, the symptoms of memory errors are often far removed from their cause. This follows from the nature of the heap: unrelated data are stored in adjacent memory locations within the heap, so reading or writing outside the bounds of a heap object can very easily corrupt unrelated data. Likewise, reading or writing to previously freed memory can corrupt unrelated data since the heap manager may have recycled the freed memory for use elsewhere in the program.

Second, heap errors are hard to reproduce. This also follows from the dynamic nature of the heap: the allocation pattern varies from one run to the next, so different items of program data will be adjacent in memory at each run. Errors in the use of heap memory thus cause corruption of different data in each run, or, in many cases, cause no apparent symptoms if the error happens to corrupt a location in the heap that is not currently in use. This problem is compounded in multi-threaded programs, because even if program inputs are identical from one run to the next, the operating system thread scheduler will schedule threads differently, causing a different allocation pattern. Similarly, in complex client-server programs, it often is not possible to duplicate program input since inputs are concurrently arriving from many different computers.

Finally, heap errors are hard to diagnose even if they can be reproduced. The reason is that traditional development tools such as compilers and source debuggers do not have any knowledge of the heap. If a pointer error occurs, these tools do not provide information about whether the pointer was allocated from the heap, and if so what the size of the heap object is and where and when it was allocated or freed.

A number of solutions to the problem of detecting and diagnosing memory errors exist in the prior art. However, these solutions each have at least two of the following problems: 1) they require special builds of the program that are very time consuming to produce and introduce the risk of testing a different program from the one that is shipped; 2) they cause the program's runtime speed to slow very significantly, making usage on a regular basis impractical; 3) they require modification of or recompilation of the program's source code; or 4) they fail to identity a significant portion of memory errors that exist in a program.

Representative examples of prior art include the following:

Malloc Wrapper Method

In the "malloc wrapper" method, used by BoundsChecker from NuMega Technologies, Inc., heap function calls are intercepted in order to introduce checking code before and/or after the normal heap routines gain control, as illustrated by FIG. 1b. The executable 20 patched with the malloc-wrapper method contains a call 21 to the heap function malloc. At the definition of malloc 22, control transfers at transfer point 23 to the entry portion of a malloc intercept definition 24. The intercept definition returns at location 25 to the original malloc definition at transfer point 23. When the malloc definition returns at its conclusion 26, control passes to a malloc exit intercept definition 27 which returns at its conclusion 28 to the site following the call to malloc at return point 29. This method places guards at the ends of newly-allocated blocks and checks the guards during heap function calls. FIG. 2b shows control-flow when the malloc-wrapper method performs checking. The executable 50 contains a call to malloc and a reference of the allocated memory. During the call to malloc at location 51 checking occurs in the intercept definition 52, then control returns at location 53 to the original executable code.

The malloc-wrapper method suffers from performance degradation on order $O(n^2)$, where n is the number of blocks in the heap, because it checks the entire heap space for overwrites during each heap function call. Validation of heap pointer parameters is also slow since this method must search its own data structures to determine if a pointer points to valid heap memory—it cannot directly validate the heap data structure since it does not implement the heap. Not implementing the heap also causes this method to fail to identify a number of errors. It does not identify corruption of the heap's own data structures, nor does it detect most instances of reads and writes of free memory or double-frees, since the underlying heap manager immediately recycles free memory to satisfy subsequent allocation requests.

Object Code Insertion Method

In the "object code insertion" ("OCI") method, used by Purify from Pure Software, Inc., checking instructions are inserted in the program's object files, between instructions that reference memory, to monitor the program's memory reads and writes, as illustrated by FIG. 2c. The executable 60 contains a call to malloc and a reference of the allocated memory. After the call to malloc and before the following memory-reference instruction, at transfer point 61, control transfers to the checking function 62, then returns at its conclusion 63 to the original executable. This method also uses a malloc wrapper, shown in FIG. 1b, described above, to monitor the program's memory allocations and frees.

The OCI method requires a special build of the program, in which checking instructions are inserted between the program's normal instructions. The OCI method also suffers from performance degradation on the order of between 5× and 24×. The reason will be apparent to those skilled in the art: performing a function call and looking up data structures during every memory-reference instruction in a program will necessarily have a severe impact on performance. This method was originally implemented on RISC architectures, where performance degradation is on the order 5× to 10×. On CISC architectures, the performance impact is even more severe due to the number of instructions that can reference memory. Moreover, this method performs function calls and data structure references in between a program's normal instructions, which results in poor locality and few cache hits on modern CPU architectures that utilize on-chip caches; the result is further performance degradation.

Compile Time Instrumentation Method

The "compile time instrumentation" ("CTI") method, used by Insure from Parasoft Corporation, is very similar to the OCI method, except that checking statements are inserted into source code rather than into object code. This method suffers from even more severe performance degradation than the OCI method, but additionally suffers from the need to recompile the program's source code. Portions of the program for which source code is not available, such as system, compiler, and third-party libraries, cannot be checked with this method.

Summary of Prior Art

All the prior art methods for detecting memory errors suffer from severe performance degradation, particularly when the program heap size is large. Most prior art methods also fail to operate on standard builds of programs—they require special builds and/or recompiles of source code. As a result of special build and performance degradation, the program developer or tester is discouraged from using any of these prior art methods on a frequent basis.

Because of the difficulty of reproducing and diagnosing memory errors—a problem that increases with program size and complexity—it is desirable to have memory error checking active at all times during program development and testing. This allows such errors to be detected and diagnosed as soon as possible after the errors are introduced. Likewise, because memory errors sometimes do not show up until a program is subject to live inputs in production, it is desirable to have memory error checking active in deployed business-critical programs, so that the problems can be fixed before critical data becomes corrupted.

Due to the performance degradation they cause, none of the prior art methods of detecting memory errors are suitable for use at all times during program development and testing. And such performance degradation is certainly unacceptable in a deployed setting. It is this need that the present invention addresses.

SUMMARY OF THE INVENTION

The invention modifies an executing instance (target process) of an arbitrary computer program by replacing the heap manager in the target process. All functions in the process that manipulate dynamic memory are patched with replacement functions that implement improved heap management. The invention is applicable to any computer program that makes use of dynamic (heap) memory. In a second aspect of the invention, the improved heap implementation performs heap error checking in addition to managing heap storage. Alternative embodiments use the invention to improve performance (speed) using fast allocation algorithms, improve space efficiency of the program, or implement tracing of heap activity for debugging purposes.

The invention takes advantage of multi-threaded operating systems by implementing an error checking program in a thread of lower priority than the thread for the target process. This allows the error checking steps to take place while the target process is not using the processor, typically while input or output to and from the user are occurring. This use of a lower priority thread allows a minimal slow down of the target process while the error checking program checks the heap for overwrites of memory at the beginning or end of the proper location for user data. If the heap checking program were to retain control longer than a typical delay for input or output, the effect of the delay would become significant. To minimize such an effect, the heap memory is organized into pages and heap checking is performed one page at a time. Control is relinquished to the target program at the conclusion of checking each page. An adjustable delay between the checking of each page is included in the checking program to adjust for optimal completion of error checking without unacceptable delay of the target program.

Each page of the heap memory is further organized into blocks. Stored within each page is a list of the blocks within the page which are free.

To replace the heap management functions for a target process, replacement instructions for each heap management function are loaded into the address space of the target process and each transfer of control directed to the original heap management instructions is re-directed to the replacement instructions. The replacement instructions return to the point in the target process to which the original instructions would have returned such that the original instructions are bypassed. This process of replacing the original heap management function instructions with replacement instructions can be performed on a process which is already executing and which has already initialized a heap. Prior to the first transfer of control to the replacement instructions, the invented code causes an interruption of the executing process and then finds and saves in a memory the pre-existing heap allocation. Then the process is continued and when transfer of control is made to the replacement instructions with a specification of a portion of the heap, the pre-existing heap allocation is read from the memory to determine whether the specified portion is part of the pre-existing allocation.

In addition to checking the heap memory for overwrites, the replacement heap management instructions perform all of the steps of the original instructions which have been replaced and, in addition, check the parameters passed to the instructions against data previously stored in the heap to determine whether the parameters specify a valid allocation and whether a specified allocation was previously freed. Because all functions of the heap manager are replaced with replacement code of the invention, the heap manager can implement mutual exclusivity with respect to the heap checking program such that the two can both access the same heap memory without conflict, even though no such exclusivity features are included in the target executable.

BRIEF DESCRIPTION OF THE DRAWINGS

FIGS. 1a–1c are a set of control-flow diagrams contrasting a heap function call in a normal executable, a heap function call in an executable patched with prior art methods, and a heap function call in an executable patched with the invention;

FIGS. 2a–2d are a set of control-flow diagrams contrasting checking in a normal executable, in an executable patched with the malloc-wrapper prior art method, in an executable patched with the OCI or CTI prior art methods, and in an executable patched with the invention;

DETAILED DESCRIPTION OF THE INVENTION

Figure 3:
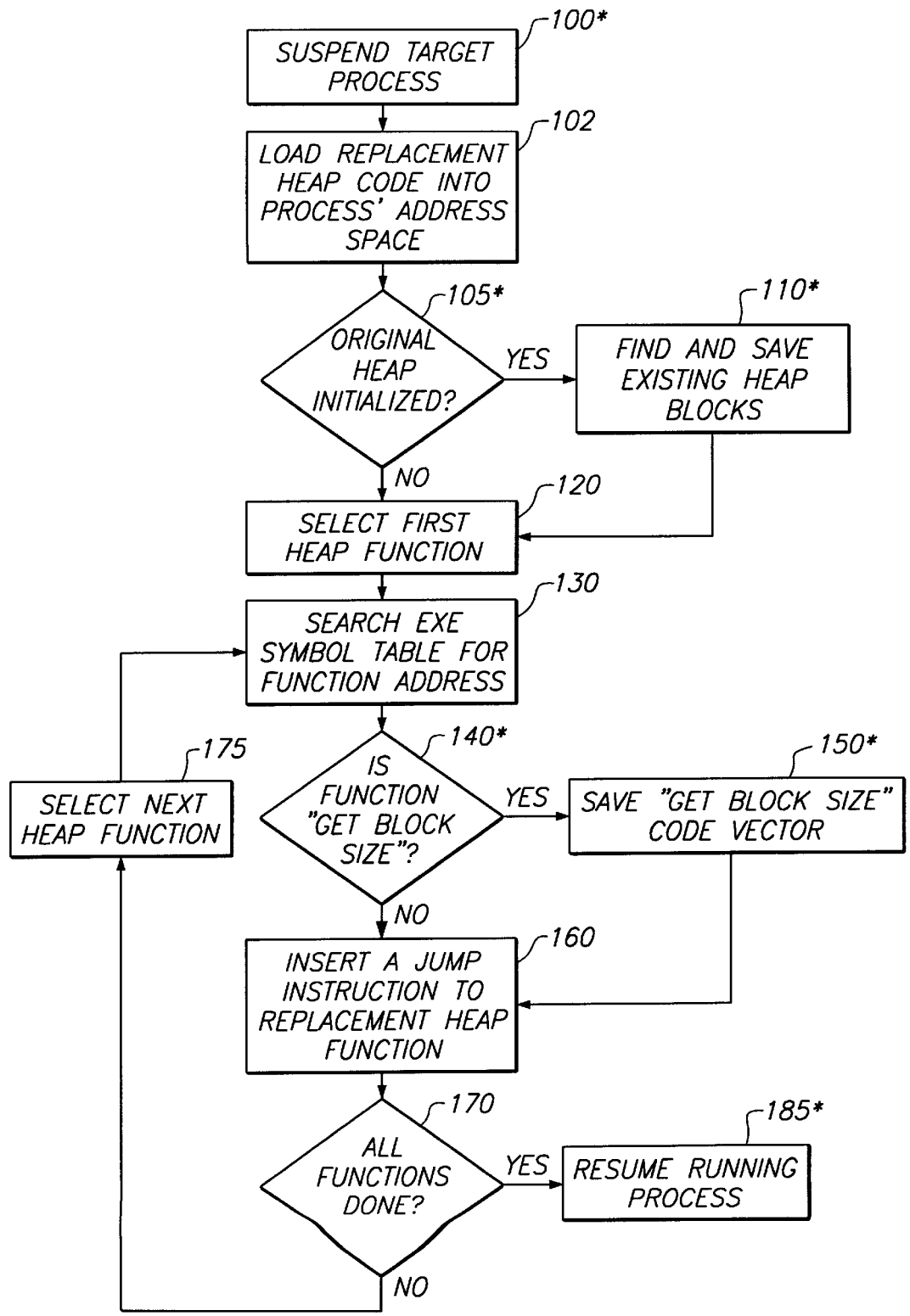
FIG. 3 is flowchart of the general heap replacement method.

FIG. 1a illustrates a heap call in a normal executable. The executable 10 contains a call 11 to the heap function malloc. The malloc 12 performs the heap operation and then returns at return point 13 to the instruction following the call to malloc at transfer point 14.

FIG. 1c illustrates a heap call in an executable modified by the invention. The executable 30 contains a call 31 to the heap function malloc. At the definition of malloc 32, a jump instruction has been inserted that transfers control at jump point 33 to the entry portion of replacement malloc definition 34. The replacement malloc definition performs the heap operation, then returns at return point 35 to the instruction following the call to malloc at transfer point 36. This contrasts with the prior art, which inserts a wrapper around the original malloc definition but does not modify the heap implementation itself.

The preferred embodiment is designed to replace C/C++ heap functions, however, the invention is applicable to computer programs written in all computer languages that directly or indirectly provide or make use of dynamic memory. The invention can be used to replace operating system heap functions and thereby improve programs written in languages whose runtime systems allocate dynamic memory from the operating system but which provide no heap facilities to programmers of the language.

In a second aspect of the invention, replacing the heap manager allows heap checking to be performed in a background thread, resulting in substantially improved performance over the prior art methods of heap checking. Such background heap checking is not possible without knowledge of heap data structures. Moreover, it is not possible at all in existing programs that use non-thread-reentrant heap implementations except by replacing the entire heap implementation, since the background heap-checking thread must synchronize access to the heap with the program's normal thread of execution.

FIG. 2a shows flow control in a normal executable 40 without error checking.

FIG. 2d shows control-flow when the invention performs checking in the background. The executable 70 contains a call to malloc and a reference of the allocated memory. Heap checking does not occur in the program's normal thread of execution, but instead occurs at lower priority in a background heap-checking thread 71. This contrasts with the prior art where checking interrupts the application's normal (foreground) instructions.

The preferred embodiment is designed for programs written in C/C++, compiled with the Microsoft Visual C++ 2.0 compiler and running on the Windows NT 3.51 or Windows 95 operating system (collectively "Win32"), so the following description is particular in some respects to the above system.

Arbitrary Heap Replacement

One aspect of the present invention is a method for replacing the heap implementation in an existing executable computer program at runtime. FIG. 3 illustrates this general method. Generally, heap replacement occurs after the target process (instance of the target program in execution) has loaded but before it begins execution. It is also possible to perform heap replacement in a process that is already running. In this case, the heap replacement method includes additional steps, indicated with asterisks (*) in FIG. 3, that are not required if heap replacement occurs before the process begins executing.

If possible, heap replacement should be performed before the target process begins executing. One way to achieve this on many operating systems is to use a debugger API, such as DebugActiveProcess in Win32, to control the target process. Heap replacement can then be performed before the target process has created any heap allocations, simplifying the implementation.

If the target process is already executing, it is suspended while heap replacement is occurring, as indicated in block 100. This is necessary to prevent the program from executing heap functions that are in the process of being patched. On non-preemptive operating systems or for single-threaded target programs, it is not necessary to suspend the target process. In operating systems that provide process-wide critical sections, this facility can be used to suspend other threads of the process. For operating systems that provide a debugger application programming interface (API), this facility can be used to suspend other threads of the process. In the embodiment described here, the heap patching is performed within a dynamic load library (DLL) entry-point, which Win32 operating systems automatically serialize within the process.

Next, in block 102, the code that implements the replacement heap is loaded in the address space of the target process. This code can be present in a DLL or shared library to facilitate dynamically loading in the target process. Alternatively, the code could also be a raw code vector stored in a disk file that is loaded into memory space allocated within the target process.

In the Win32 implementation, the replacement heap code resides in a DLL that is loaded in the target process address space using the SetWindowsHookEx function to create a WH_SHELL global hook, specifying the module handle of the DLL as the hMod parameter of SetWindowsHookEx. Alternatively, in Windows NT, the DLL can be loaded in the address space of the target process by specifying the DLL name in the value of type REG_SZ and name "AppInit_DLLs" in the "HKEY_LOCAL_MACHINE\SOFTWARE\Microsoft\Windows NT\CurrentVersion\Windows" key of the Windows NT registry. In Windows NT, the Win32 CreateRemoteThread provides still another technique for loading a DLL in the address space of another process. On other operating systems, such as most Unix operating systems, the debugger API can be used to load a shared library in the address space of the target process.

If the target process is already executing and has initialized its heap, block 105, then the existing heap allocations are located and saved in block 110. This is necessary so that a the replacement heap manager can recognize allocations from the preexisting heap if those allocations are subsequently freed or reallocated. In a Microsoft Visual C++ 2.0 program, the _heapwalk compiler runtime library (CRT) function, called in the context of the target process, can be used to locate existing heap allocations. As an optimization in Win32, only those allocations with distinct high 16 bits need be saved since the Win32 address space is organized with 64K granularity, so any pointers to heap memory with a common high 16-bit pattern are necessarily allocated from the same heap.

In block 120, the first heap function to be replaced is selected. In general, the set of heap functions replaced are: malloc, calloc, realloc, and free in ANSI C programs, plus operator new and operator delete in C++ programs. In addition, many compiler CRT's include additional heap-related functions, each of which must be replaced with an emulated implementation. In Microsoft Visual C++ 2.0, the set of additional CRT heap functions are: _expand, _heapadd, _heapchk, _heapmin, _heapset, _heapwalk, and _msize. If an implementation replaces operating system heap as well as the C/C++ heap, all operating system heap functions must similarly be replaced with emulated counterparts.

For each heap function that is replaced, the executable's symbol table is searched, in block 130, for the function name, to locate the function's address. In Win32, for executables built with a DLL version of the CRT, the addresses of these functions can easily be located by calling the GetProcAddress Win32 function, specifying the module handle of the applicable CRT DLL as the first parameter and the heap function name as the second parameter. If an executable is built with debugging information, the API for querying and/or the format of the debugging information can generally be obtained from the compiler vendor of the compiler that was used to build the target executable.

If the target process is already executing and has initialized its heap, then, at block 140, if the current heap function is _msize, in the case of Microsoft Visual C++ 2.0, or another function that returns the size of a given heap block, then save the code vector and address of this function, block 150. The number of bytes of code vector to save is equal to the number of bytes of code vector that will be overwritten in block 160 below. The reason _msize's code vector is saved is so that the emulated _msize function in the replacement heap implementation can return the correct size of any preexisting heap allocations, in the event heap replacement was not performed before the process started executing.

In block 160, insert a jump instruction at the current heap function's address, the target of the jump being the corresponding replacement heap function. In the case of the Win32 Intel implementation, the jump instruction is inserted by storing a 5-byte code vector consisting of the op code E9 followed by the 32-bit displacement from the current instruction to the target instruction. The code vector is stored at the preexisting heap function's address using the WriteProcessMemory Win32 function. For other operating systems, a debugger API can be used to perform this code patching, or, alternatively, the access rights of this region of code can be temporarily changed from execute to read/write to allow the code vector to be written directly to memory.

If, in block 170, all the preexisting heap functions have not been patched with their replacement counterparts, then select the next heap function, block 175, and continue at block 130. When all heap functions have been patched, resume running the target process, in block 185. During this execution, all heap calls in the target process are performed by the replacement heap manager.

If the heap replacement occurred after the process began execution and after the preexisting heap was initialized, then the replacement heap manager may be passed pointers to preexisting heap allocations. In this event, replacement heap functions must correctly handle such preexisting heap pointers. The addresses of preexisting heap allocations were saved for this purpose in block 110 as was the address and code vector of the preexisting _msize function in block 140. If the function free is passed a preexisting heap pointer, it returns without performing any operation. If the function _msize is passed a preexisting heap pointer, it temporarily restores the preexisting _msize code vector at the preexisting _msize function's address, calls this _msize with the preexisting allocation, repatches the preexisting _msize with a jump to the replacement _msize, and returns the result. If the function realloc is passed a preexisting heap pointer, preexisting _msize is called as just described to determine the preexisting heap block's size, then malloc is used to allocate a new block of the size requested, and the contents of the preexisting heap block are copied to the new block. The number of bytes copied is the smaller of the new size and the preexisting size.

Error-Detecting Heap Implementation

The arbitrary heap replacement method described above permits the replacement heap to be implemented in any manner that is useful, provided that the interfaces of the replaced heap functions provide compatible behavior with the preexisting heap implementation.

Figure 4:
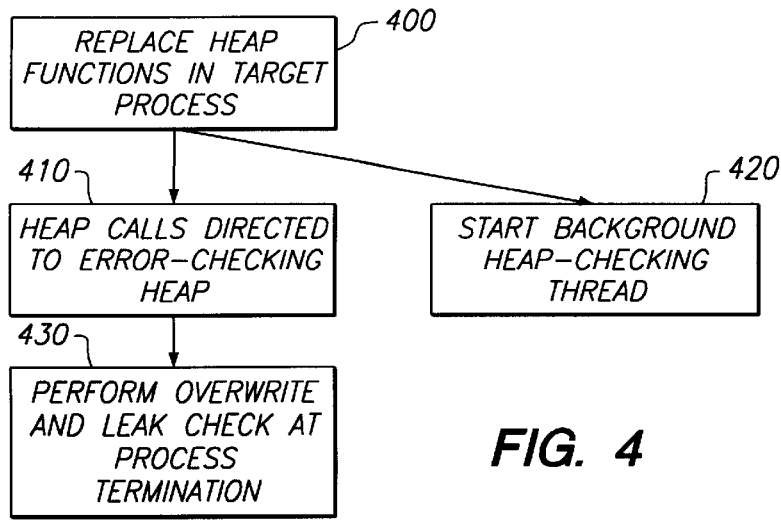
FIG. 4 illustrates the general steps performed by the error-checking heap implementation.

In a second aspect of the invention, the heap implementation provides memory error detection and fast allocation algorithms. FIG. 4 shows a flowchart of steps performed by the error-checking heap. First, in block 400, the error-checking heap manager is injected into the target process using the arbitrary heap replacement method described above. Once all heap functions in the target process have been replaced, a background heap-checking thread is started, in block 420, to perform incremental checking for heap overwrites. In the target process normal thread(s), all heap calls are directed, in block 410, to the heap-checking implementation. At process termination, block 430, the entire heap is checked for overwrites that may have occurred since the last background scan, and the heap is checked for unfreed allocations (leakage).

FIG. 5 shows flowcharts of the methods used to allocate and free memory blocks in the error-checking heap implementation. In order for the heap implementation to scale to very large heap sizes in the presence of virtual memory, and in order for the background heap-checking thread to perform efficiently under these circumstances, the heap is organized into pages that are a multiple of and close to the size of the operating system virtual memory manager's page size. 16 kilobytes is used for the heap page size in the preferred embodiment. Allocation requests smaller than the heap page size are sub-allocated within an available heap page; larger blocks are given their own heap page whose size matches the allocation request size rounded up to the next heap page size boundary.

A page table is maintained in the heap, which contains an entry for each page in the heap. The page table is stored very compactly in memory so that it can be scanned with optimum locality. This is important in virtual memory environments where the heap size can grow beyond physical memory. Each page table entry contains a pointer to the corresponding heap page, the size of the largest free space on the given page, and links to the previous and next page table entries. All page table entries are linked in a circular list to facilitate a "first fit" policy of heap searching.

Each heap page is aligned at a known power-of-two boundary address, 64 kilobytes in the preferred embodiment. This allows access to the heap page header from any pointer to heap memory to be implemented in a single instruction; simply a mask of the appropriate number of high bits, 16 bits in the preferred embodiment.

The heap page header contains a signature, used for heap pointer validation, and a free-list of available regions on the heap page. Following the heap header are the heap blocks. Each heap block is aligned on an address boundary suitable for storage of any data type on the target processor, generally either 4 bytes or 8 bytes. Each block contains a two-byte header that records the block size in the upper 14 bits, whether the block is currently in use in the LSB (bit 0) and whether the previous block is in use in bit 1.

Following the block header is a debugging block header that stores a signature for validating heap pointers, flags identifying the state of the block, and various information about where and when the block was allocated. The callstack, requested size, file, line, thread and process where the block was allocated are among the debugging information stored here in the preferred embodiment. For in-use blocks, a guard of 4 or more bytes is placed between the debugging header and the block's user data area. This guard is used to detect underwrites before the beginning of heap pointers. Following the user data area is a similar guard to detect overwrites. The guard areas are filled with a special signature that is an invalid pointer value and an unusual integer value. The value hex FCFCFCFC is used in the preferred embodiment. The user data area of newly allocated blocks is filled with another signature value, again an invalid pointer and unusual integer, hex EBEBEBEB in the preferred embodiment.

For free blocks, links to the previous and next free block are stored in the debugging header area. All free blocks within a heap page are linked in a circular list to facilitate a "first fit" policy of heap searching. The free-list is intra-page rather than inter-page to provide optimum locality for both heap searches and heap checking.

Blocks can also have a state of "defer-freed", meaning that they have been freed by the target program but they are not yet available for subsequent allocation requests. Such blocks are held in a FIFO queue of defer-freed allocations. These queue links are stored in the block debug header—the same area used to link free blocks within a page for blocks in the "free" state. The defer-free queue is of a runtime-configurable length. When this queue length is exceeded, the oldest item in the list is removed from the queue and added to the free-list of its page, thus making it available for subsequent allocation requests.

This deferred freeing of heap memory greatly increases the likelihood that references to free memory, including reads, writes, and double-frees, will be detected. The user data and guard areas of free and defer-freed memory are filled with a special signature that is an invalid pointer value and an unusual integer value. The value hex DDDDDDDD is used in the preferred embodiment.

Filling guards and free memory with distinct, unusual, non-pointer values allows writes into these areas to be detected by the background heap-checking thread. Filling uninitialized memory with a non-pointer, unusual value serves two purposes: first, to cause an error in programs that unknowingly rely on the value zero in newly-allocated heap memory; and second, to cause a hardware exception if an attempt is made to dereference a value read from uninitialized (or free or guard) memory. In both cases, the default behavior of not initializing newly-allocated or newly-freed heap memory is often no symptom at all, because the most common value in memory on most computer systems is zero, and the most likely contents of newly freed memory is the contents stored in that memory prior to freeing it. Frequently, often inadvertently, but always erroneously, programs rely on these values being in memory, resulting in very sporadic, hard-to-reproduce failures.

Figure 5A:
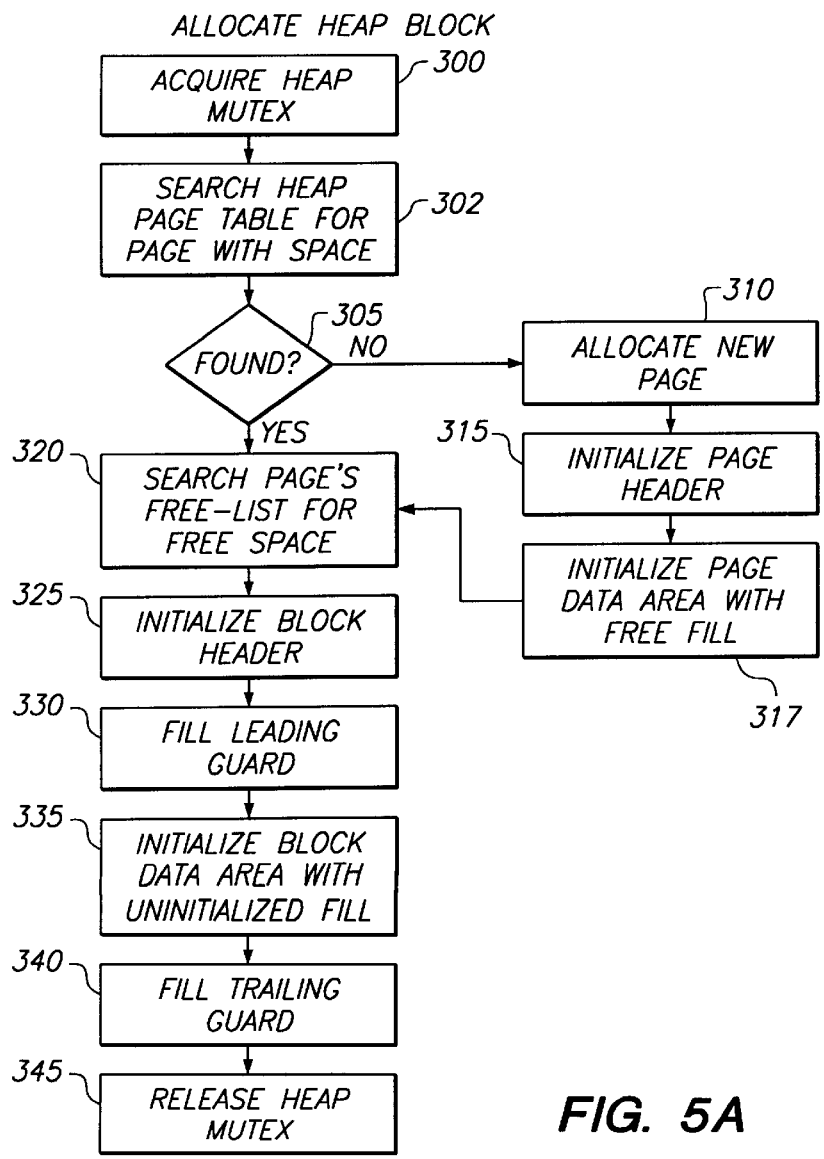
FIGS. 5a–5b illustrate the general procedure for allocating and deallocating memory in the error-checking heap.

The error-checking heap's allocation operation, typically the malloc function, is illustrated beginning at block 300 of FIG. 5a. First, the heap's mutex is acquired to ensure mutual exclusion between this allocation and heap activity in other threads, including the background heap-checking thread. At block 302, the heap page table is searched for a page with sufficient free space. If no such page is found, block 305, a new page is allocated from the operating system at block 310 and initialized at blocks 315 and 317. The page's free-list is searched at block 320, and when a free block of sufficient size is found, its header is initialized in block 325. The block's leading guard, user data area, and trailing guard areas are filled with the appropriate signatures in blocks 330, 335, and 340. The heap mutex is released in block 345 and a pointer to the first byte of the block's user data area is returned.

Figure 5B:
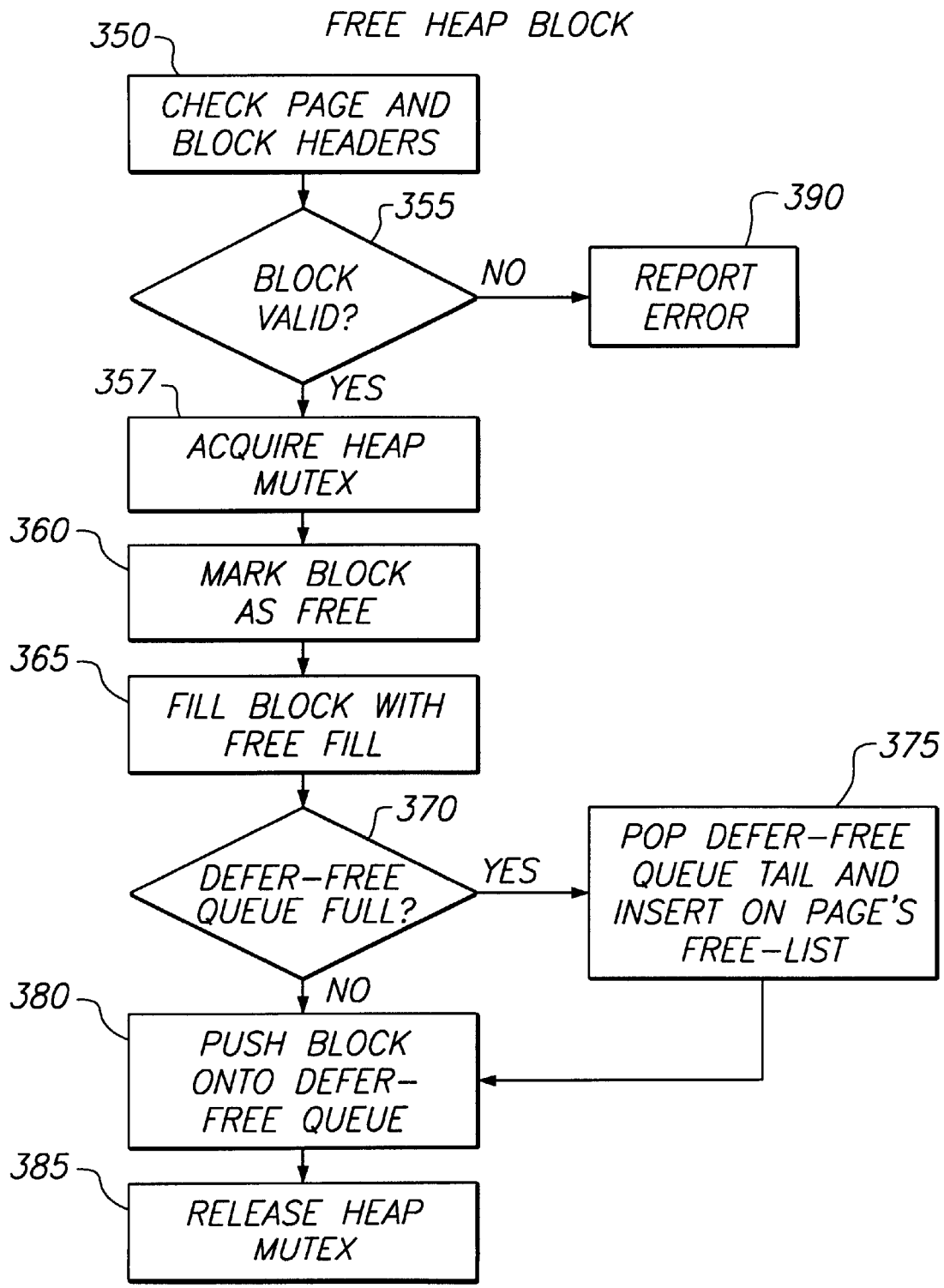

The heap's freeing operation, typically the free function, is illustrated beginning at block 350 of FIG. 5b. First the block's header is validated by checking the signature located at a known offset before the beginning of the user data area of the block. The block's page's signature is also checked—the page header is found very quickly by masking off the low-order bits of the heap pointer. The state of the block is checked, which must be "in-use" to be valid for the free function. If the block is determined to be invalid or previously-freed, block 355, an error is reported, block 390, and the free function returns.

If the block is valid the heap mutex is acquired in block 357. The block is marked as "free" in block 360 and filled with the free signature in block 365. If the queue of defer-freed allocations is full, block 370, the oldest item is removed from the queue and placed on its page's free-list in block 375. The newly-freed block is then placed on the queue of defer-freed allocations in block 380. The heap mutex is released in block 385 and the free function returns.

By implementing the heap with this paged heap method, memory allocation performance is often significantly faster compared to the compiler or operating system heap manager that is replaced. This mitigates the added overhead of order O(c) checking performed during heap calls, resulting in negligible net performance impact. In programs with large heaps, performance may actually improve when the program's heap is replaced with the page based version implemented with the above method.

Incremental Heap Checking in Background Thread

A third aspect of the invention is a method for incrementally checking heap memory for overwrites using a background thread. Because the invention replaces the entire heap implementation in the target process, it becomes possible to use knowledge of the heap internals to perform heap checking in a novel manner. Rather than performing heap checking during heap calls or between the target program's instructions, as the prior art does, heap checking can be performed in a separate thread of execution, exploiting modern multi-threaded operating systems and symmetric multi-processor (SMP) computers. The invention performs heap checking in parallel with normal program execution rather than serially.

Most programs, particularly those with a graphical user interface, spend more than 50% of elapsed time waiting for input. The CPU is thus idle much of the time. This invention takes advantage of those idle CPU cycles to perform heap checking that, in the prior art, causes unacceptable performance degradation of the program being checked.

Two aspects of the error-detecting heap implementation make parallel heap checking possible. First, it is thread-reentrant, so a second thread can safely access heap data structures even in programs built with non-threaded runtime libraries; second, it is a paged heap design so heap checking can be performed incrementally. This second aspect is critical, for if the background heap-checker kept the heap mutex locked for extended periods, the program's other threads would be kept waiting for access to the heap. In that case, heap checking may as well occur serially since the effect on performance is the same.

The current invention's heap page-table allows heap checking to be performed in small units so that the program's normal threads never wait for checking. The heap-checking thread operates at idle priority and relinquishes the CPU by sleeping for a period, 100 milliseconds in the preferred embodiment, between each page of the heap that is checked. The effect is that heap checking utilizes otherwise idle CPU cycles, or a second CPU if present, to perform its checking.

Another factor is that in virtual memory environments, checking the entire heap will result in an unacceptably large working set size for the application and the resulting swapping causes unacceptable performance degradation. By checking the heap one page at a time, the invention maintains good locality and has negligible impact on swapping.

Figure 6:
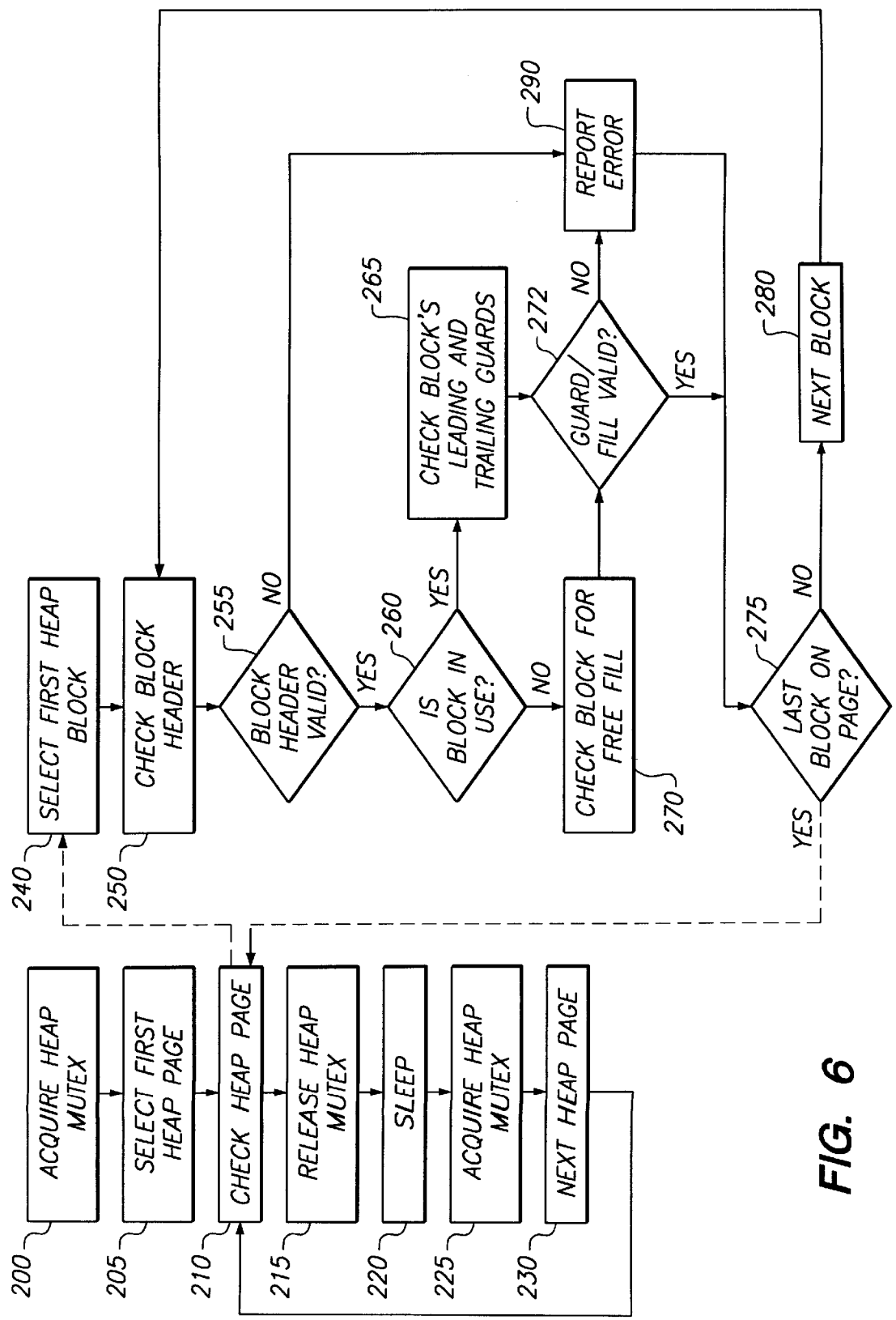
FIG. 6 illustrates the general procedure for performing background heap checking.

FIG. 6 shows a flowchart of the incremental background heap-checking method. In block 200, the heap-checking thread acquires the heap mutex. Next, it selects the first heap page in block 205. In block 210, a single page of the heap is checked. After checking a single page, the heap mutex is released, block 215, and the heap-checking thread sleeps, block 220, to relinquish the CPU without holding the heap mutex. Upon reawakening, the heap-checking thread re-acquires the heap mutex, block 225, selects the next heap page, block 230, checks that page, block 210, and so on. The heap manager may add or remove pages to the heap in between checks of individual heap pages. This does not interfere with the heap-checking threads' iteration over heap pages, as the page table entries the heap-checker iterates over remain valid across such growing and shrinking of the heap.

Checking of an individual heap page begins at block 240, where the first block in the heap page is selected. The block header is checked in block 250. Here, the internal data structures such as free-list linkages and the size stored in the header are checked, as well as the block and page signature. If, in block 255, the block header is determined to be corrupted, an error is reported, block 290. If the block header is valid, the block state is checked in block 260. If the block is free, block 270, the guard and user data area are checked for the free fill. If the block is in-use, block 265, the block's guard areas are checked for the guard fill. If the guard or free-fill values have been overwritten, block 272, an error is reported, block 290. If, at block 275, this is the last block on the page, the heap-page check returns. If this is not the last block on the page, the next block is selected by incrementing the block address by the block size stored in the block header, block 280. The next block's header is then examined and process is repeated at block 250.

Summary of Benefits of the Invention (1) Error-checking itself is faster and more comprehensive than in the prior art because:

debugging information is stored at a known offset from user data rather than in a separate data structure—no searching is needed;

heap pointer validation is much faster, since internal heap signatures are at known offsets;

faster heap algorithms mean checking can be done with minimal net slowdown;

checking for overwrites can be performed in the background during idle CPU cycles rather than interrupting and slowing program execution;

corruption of the heap's own data structures can be detected only if heap implementation details are known by the heap-checker; and the entire heap is checked, not only in-use blocks or heap references from certain source or object files.

(2) The invention works with standard builds.

(3) The invention can be used all the time during program development.

(4) The invention detects errors earlier in the development cycle.

(5) The invention can be applied to fault detection in testing and production environments.

The above description is intended to be illustrative and not restrictive. Many other embodiments will be apparent to those of skill in the art.

I claim:

1. For an executing target process run on a computer with a computer memory address space allocated for the process which has already initialized a heap and stored in a memory location a preexisting heap allocation, a method for replacing original instructions of a heap management function for acting on a heap memory comprising:

(a) loading into said address space of the target process replacement instructions for said heap management function;

(b) reading said preexisting heap allocation and saving it in a second memory location;

(c) redirecting to said replacement instructions a transfer of control originally directed to said original instructions, which transfer is accompanied by a specification of a portion of the heap;

(d) upon said transfer of control to said replacement instructions, reading said second memory location and determining whether the specified portion of the heap is part of the preexisting allocation; and (e) returning from said replacement instructions to the point in the target process to which said original instructions would have returned, such that said original instructions are bypassed.

2. For an executing target process run on a computer with a computer memory address space allocated for the process which has already initialized a heap and stored in a memory location a preexisting heap allocation, a computer readable medium containing a set of computer executable instructions for replacing original instructions of a heap management function for acting on a heap memory, which executable instructions cause a computer to perform the following steps:

(a) loading into said address space of the target process replacement instructions for said heap management function;

(b) reading said preexisting heap allocation and saving it in a second memory location;

(c) directing to said replacement instructions a transfer of control originally directed to said original instructions, which transfer is accompanied by a specification of a portion of the heap;

(d) upon said transfer of control to said replacement instructions, reading said second memory location and determining whether the specified portion of the heap is part of the preexisting allocation; and (e) returning from said replacement instructions to the point in the target process to which said original instructions would have returned, such that said original instructions are bypassed.

3. A computer system for use with an executing target process run on a computer with a computer memory address space allocated for the process, which has already initialized a heap and stored in a memory location a preexisting heap allocation, with means for replacing original instructions of a heap management function for acting on a heap memory, comprising:

(a) means for loading into said address space of the target process replacement instructions for said heap management function;

(b) means for reading said preexisting heap allocation and saving it in a second memory location;

(c) means for directing to said replacement instructions a transfer of control directed to said original instructions, which transfer is accompanied by a specification of a portion of the heap;

(d) means for, upon said transfer of control to said replacement instructions, reading said second memory location and determining whether the specified portion is part of the preexisting allocation; and (e) means for returning from said replacement instructions to the point in the target process to which said original instructions would have returned, such that said original instructions are bypassed.

* * * * *